United States Patent
Troemel

(10) Patent No.: US 6,239,937 B1
(45) Date of Patent: May 29, 2001

(54) ADAPTIVE LAST-TRACK POSITIONING SCHEME FOR HARD-DISK DRIVE FORMATTING

(75) Inventor: Michael Gustav Troemel, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/150,881

(22) Filed: Sep. 10, 1998

Related U.S. Application Data

(60) Provisional application No. 60/059,494, filed on Sep. 22, 1997.

(51) Int. Cl.[7] .................................................. G11B 21/02
(52) U.S. Cl. .............................. 360/75; 360/74.1; 360/60
(58) Field of Search .................. 360/75, 48, 31, 360/74.1, 60, 74.4, 72.1, 72.2, 74.5; 369/36, 55, 58; 324/212, 226

(56) References Cited

U.S. PATENT DOCUMENTS

| | | | |
|---|---|---|---|
| 5,168,412 | * 12/1992 | Doan et al. | 360/137 X |
| 5,917,669 | * 6/1999 | Johnson et al. | 360/53 |
| 6,008,640 | * 12/1999 | Tan et al. | 360/31 X |
| 6,061,197 | * 5/2000 | Wiselogel | 360/60 |
| 6,130,796 | 10/2000 | Wiselogel . | |

FOREIGN PATENT DOCUMENTS 53-117405 * 10/1978 (JP) ........................................ 360/75

* cited by examiner

Primary Examiner—Alan T. Faber
(74) Attorney, Agent, or Firm—Derek J. Berger; Jonathan E. Olson; Shawn B. Dempster

(57) ABSTRACT

A disk drive manufacturing system and process which includes head to disk interference equipment, servo writing equipment, formatting and controlling firmware. The system servo writes a varying number of data tracks per disk surface while sensing when the head is positioned over the transition and/or landing zones of the magnetic disk surface. The servo writing of tracks continues as far as possible on each disk surface, and stops just before the transition zone region of the landing-zone is encountered. Each disk processed has a varying number of data-tracks per surface, which variable data-track information is factored and utilized in a further step of formatting the disk in accordance with the changed boundaries of the data zone and in accordance with instructions received from a disk drive's formatting and controlling firmware.

9 Claims, 4 Drawing Sheets

ADAPTIVE LAST-TRACK POSITIONING SCHEME FOR HARD-DISK DRIVE FORMATTING

RELATED APPLICATIONS

This application is related to co-pending Provisional Patent Application Ser. No. 60/059,494, entitled: "Adaptive Last-Track Positioning Scheme For Hard-Disk Drive Formatting", filed Sep. 22, 1997 by the same applicant.

This application is also related to patent application Ser. No. 08/831,855, now U.S. Pat. No. 6,130,196, by Wiselogel entitled: "Disk Drive Apparatus Having Adaptive Control of Track Pitch and Method Of Providing", filed Apr. 2, 1997, and assigned to the same assignee as the present invention.

This application is also related to patent application Ser. No. 08/831,856, now U.S. Pat. No. 6,061,197, by Wiselogel entitled: "Adaptive Control of a Write Inhibit Signal in a Disk Drive Based On Adaptive Track Pitch", filed Apr. 2, 1997, and assigned to the same assignee as the present invention.

This application is also related to patent application Ser. No. 08/940,929 now U.S. Pat. No. 6,008,640, by Tan, et al. entitled: "Detection & Measurement of Head Disc Interference Using Read Back Signal (Without Acoustic Emission Sensor or Laser Doppler Vibrometer)", filed Sep. 30, 1997, and assigned to the same assignee as the present invention.

TECHNICAL FIELD

The present invention relates to disk drive apparatus and methods. More particularly, the present invention relates to the disk drive's magnetic disk and methods of determining an actual last data recording trick in the magnetic disk region known as the data zone. Even more particularly, the present invention relates to the disk drive's magnetic disk and methods of determining an actual last data recording track in the magnetic disk region known as the data zone and formatting the magnetic disk in accordance with the data zone as bounded by the determined last data recording track.

BACKGROUND ART

Disk drives are apparatus comprising one or more substantially thin, magnetic disks that are rotated by a spindle motor that is responsive to the drive's control mechanism and associated electronics that communicate data via read and write heads. The disk drives are used in computer systems, such as personal computers, laptop computers and workstation equipped with computer systems, to store large amounts of data, (giga-byte range), in a form that is machine readable for subsequent use by a user. The magnetic disk comprises a surface of magnetizable material having a number of annular regions, called tracks, that extend circumferentially around the disk. Each track is divided into blocks called sectors. To reach a given overall capacity, disk-drives store information and other identification information in the sectors in the form of discrete bits or magnetic transitions written in a concentric manner on the above-mentioned discrete data tracks. The reading and writing of data is accomplished by read and write heads and are positioned over the required track by the drive's positioning control system. The drive's ultimate capacity then, is a function of the number of individual data tracks multiplied by the number of bits written in each track. Current drive formatting techniques will write or encode a fixed, maximum number of bits in each track, hence to reach a given fixed total capacity, the drive will have a fixed number of data tracks. The positioning of these fixed data tracks is determined during a servo-track writing operation. The quantity of data that can be stored on a disk depends upon how much of the surface area is magnetized for the storage of a bit. Ideally, use of the entire disk surface for writing data is a desirable objective. However, the ideal objective is not yet possible.

Current disks used in magnetic disk drives will often have discrete landing and data-zones defined during the disk manufacture. This usually takes the form of a smoother surface in the data-zone to reduce interference between the head & disk during normal drive operation and a rougher surface in the landing-zone to maintain low friction between the head & disk during start-stop operation. Depending on the design, some disks will also have a region of intermediate roughness between the landing and data-zones, usually called the transition-zone. The landing and transition zones are always placed at the inner-radius of the disk with the data-zone extending to the outer edge of the disk. During normal, dynamic operation, the head can encounter a significantly higher level of interference with the disk if it is positioned over the landing zone. This interference can lead to several types of errors during reading & writing, hence there are no data-tracks written into the landing zone and a limited-to-no tracks written in the transition zone.

As briefly stated, during a manufacture process, magnetic hard-disk drives go through a servo-writing operation during which servo information is written on the surface of each disk. This information, is usually in some form of a discrete series of transitions or bursts written at ½ track spacing, is used to provide feedback information to the drive electronics to allow accurate positioning of the read/write head elements over a given data track. In general, the servo-writing process is done from disk outer-diameter to inner-diameter with the positioning of the heads controlled by an external, laser-interferometer-based servo-track-writer apparatus.

There are normal positional tolerances that apply to the actual physical location of the landing, transition and data-zones on the disk, additionally there are normal positional tolerances that apply to the actual physical location that the servo-track writer writes the discrete tracks at. To ensure that no data is written in the landing or transition zones, and given that there are the aforementioned tolerances on actual positioning which behave in a statistical manner, there must be a position guardband comprising unused tracks to ensure that in worst case conditions, the last data-track is not written into the transition or landing zone during the servo-write operation, see generally FIG. 1. The position guardband allocated on the disk(s) when servo-writing results in disk drives having an un-used, inner diameter portion located just outside of the transition and landing zones. The actual number of unused track portions can be determined if the statistical distributions of the tolerances are known.

In the above referenced related patent application, Ser. No. 08/831,855, by Wiselogel, a manufacturing process of building a disk drive utilizes a measuring instrument that determines an actual data zone region which comprises an actual distance from an inner diameter head crash stop region to the outer diameter head crash stop region. The process includes computational steps for comparing stored nominal design track density information versus the actual measurement to determine whether there is any extra disk space in the measured region that can be divided among the data tracks in the nominal track distribution to effectively decrease the actual track density of the disk and effectively increase the space used for data. The referenced invention does not address determining the last unused track which can reliably be used as a data-track.

Also in the above referenced related patent application Ser. No. 08/831,856, by Wiselogel, a write inhibit threshold value is adaptively modified for each drive which is based on the actual track pitch that is adaptively controlled during the disk drive manufacturing process taught in Ser. No. 08/831,855, by Wiselogel. The referenced invention does not address determining the last unused track which can reliably be used as a data-track.

Thus, a need is seen to exist for a method for eliminating the position guardband on a disk drive magnetic disk to facilitate utilization of the eliminated guard band portion of the disk for storing data and which method further determines a last data-track in the data zone and facilitates formatting the magnetic disk in accordance with the changed boundaries of the data zone.

A related need is seen to exist for a disk drive apparatus whose magnetic disk media has been manipulated such that the position guardband has been eliminated and which has a data zone with changed boundaries and a last data-track determined to facilitate a magnetic disk formatting arrangement in accordance with the changed boundaries of the data zone.

It is, therefore, a primary object of the present invention to provide a method for eliminating the position guardband and increasing the data zone space on a disk drive magnetic disk to facilitate utilization of the eliminated guardband portion of the disk for storing data and for determining a last data-track in the data zone and facilitating formatting the disk in accordance with the changed boundaries of the data zone.

A related object of the present invention is to provide a disk drive apparatus whose magnetic disk media has been manipulated such that the position guard band portion has been eliminated to facilitate utilization of the eliminated guard band portion of the disk for storing data and which has the last data-track in the data zone determined for facilitating the disk drive apparatus having a disk formatting arrangement in accordance with the changed boundaries of the data zone.

DISCLOSURE OF INVENTION

Accordingly, the foregoing objects are accomplished by providing a disk drive servo writing manufacturing process comprising steps that include servo writing a varying number of data tracks per disk surface while sensing when the head is positioned over the transition and/or landing zones, servo writing tracks as far as possible on each disk surface, and stopping just before the transition zone region of the landing-zone is encountered. Additionally, since each disk comprises a varying number of data-tracks per surface, the method further includes a step of formatting in accordance with the changed boundaries of the data zone and in accordance with instructions received from a disk drive's formatting and controlling firmware. A disk drive processed in accordance with the process of present invention results in an apparatus having the stated objectives.

The manufacturing process of the present invention results in eliminating, or at least optimizing, the disk inner portion, referred to in the prior art as the fixed position guardband, to effectively increase the data zone region. The manipulated magnetic disk(s), processed in accordance with the present invention, result in having their outer-most data-track fixed, and having their inner-most track adaptively positioned depending upon the actual physical location of the transition & landing zones for a given magnetic disk surface. Stated differently, the process is an adaptive last-track positioning process for the manufacture of disk drives.

Additionally, since each disk comprises a varying number of data-tracks per surface, the method further includes a step of formatting in accordance with instructions received from a disk drive's formatting and controlling firmware. The formatting step factors the variable data tracks per surface such that a pre-process fixed capacity for the disk drive is again met. The factoring considers that varying number of data-tracks per surface necessitates a varying maximum number of bits recorded per data track on a given surface. Allowing a varying number of tracks for a given surface will ensure the maximum usage of each disk's available surface. The net result of implementing this scheme when directly compared to the current scheme with a fixed number of data tracks is a reduction in the number and density of bits written on each data-track. For various well-defined reasons, this reduction in density will directly translate into a reduced (or improved) error-rate when reading back written data. This reduction in error-rate can directly translate into improved drive manufacturing yields and an improvement in drive reliability at customer sites.

Other features of the present invention are disclosed or apparent in the section entitled: "BEST MODE FOR CARRYING OUT THE INVENTION."

BRIEF DESCRIPTION OF DRAWINGS

For fuller understanding of the present invention, reference is made to the accompanying drawings in the following detailed description of the Best Mode of Carrying Out the Present Invention. In the drawings.

Figure 1:
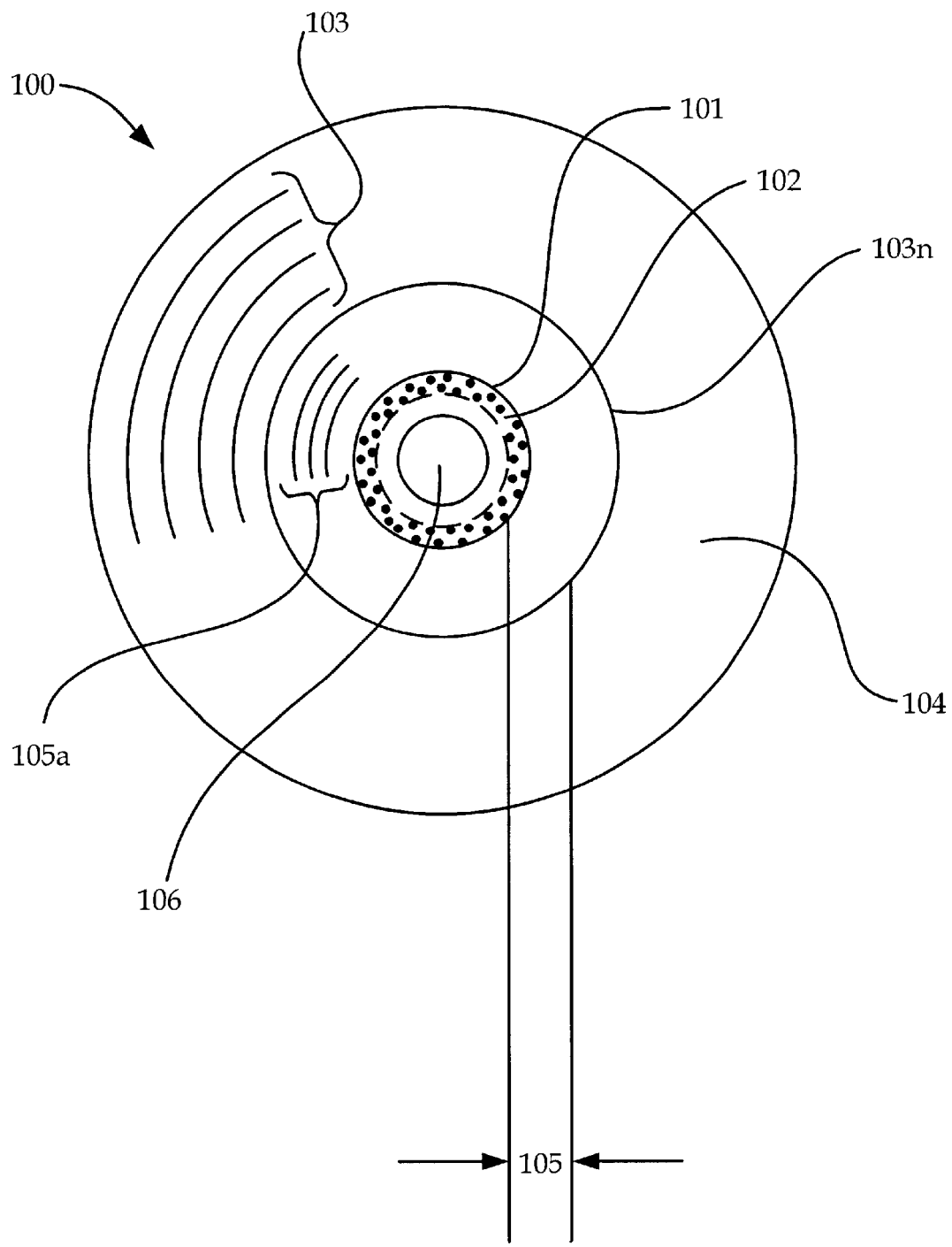
FIG. 1 is a graphical illustration of a magnetic disk used in disk drives showing the prior art allocation of disk tracks that includes the allocation of a guard band comprising extra tracks in the inner guard band to maintain drive reliability.

Reference numbers refer to the same or equivalent parts of the present invention throughout the several figures of the drawing.

BEST MODE OF CARRYING OUT THE INVENTION

As briefly discussed above, and as shown in FIG. 1, the prior art teaches that a magnetic disk 100, having a spindle mounting means in the form of hole 106, is typically provided having a track distribution comprising a landing zone 101 and a data zone 104. Landing zone 101 also includes a transition zone 102 and data zone 104 also includes a guard band region 105. Mounting means 106 is provided centrally located on the magnetic disk 100 for attachment to the disk drive's spindle motor. FIG. 1 shows that data zone 104 comprises a plurality of data tracks 103 where the last-data track 103n is fixed at the end of guard band 105. Guard band 105 is ample in space and extends to transition zone 102. Guard band 105 includes extra tracks 105a which are provided as a means of managing positioning accuracies associated with drive head crash stop tolerances that impact the reliability of the drive. Data zone 104 in each of the disk drive's magnetic disk is critical in establishing the capacity of the drive. As stated previously, a disk drive product development efforts include the establishment of a fixed capacity of the drive.

Figure 2:
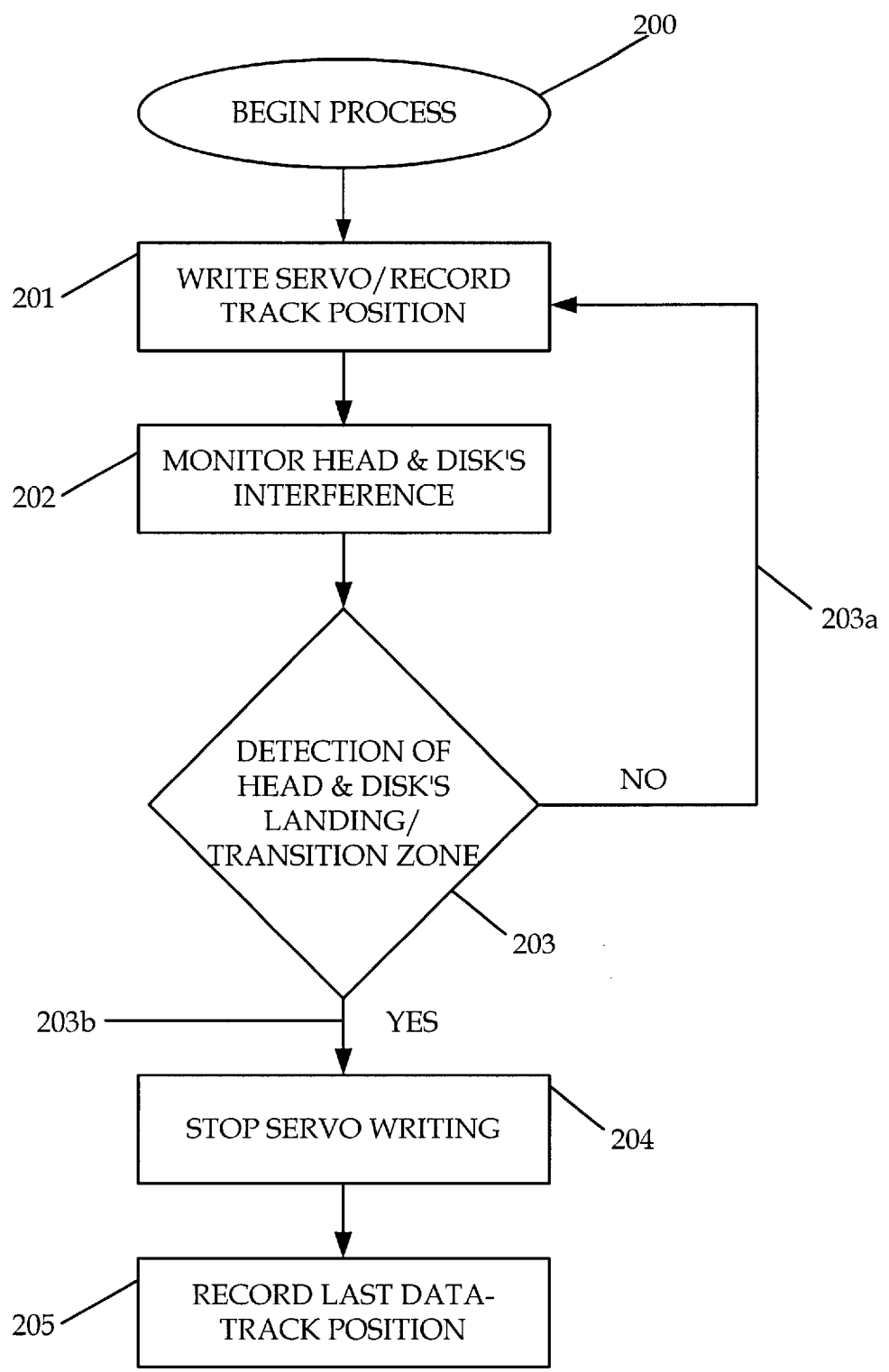
FIG. 2 is a servo writing process flow for eliminating the guard band portion of the disk for storing data and determining a last data-track in the data zone, in accordance with the present invention.

In accordance with the objects of the present invention, the position guardband 105 is optimally, or substantially eliminated to increase the data zone space 104 on a magnetic disk 100. This operation effectively changes the boundaries of the data zone 104. The "optimally, eliminating, or substantially eliminated" language used herein is in spirit with the objective of reliably maximizing the use of the data zone portion of a magnetic disk. There are two (2) general methodologies required to implement this idea. FIG. 2 shows first method 200 which basically comprises process steps of servo writing and head/disk interference monitoring. The second method 300, shown in FIG. 4, comprises a formatting operation which factors the varying number of data-tracks per surface, to arrive at a predetermined fixed byte capacity for the disk drive. The disk drive's formatting and controlling firmware are employed to perform this operation.

Figure 3:
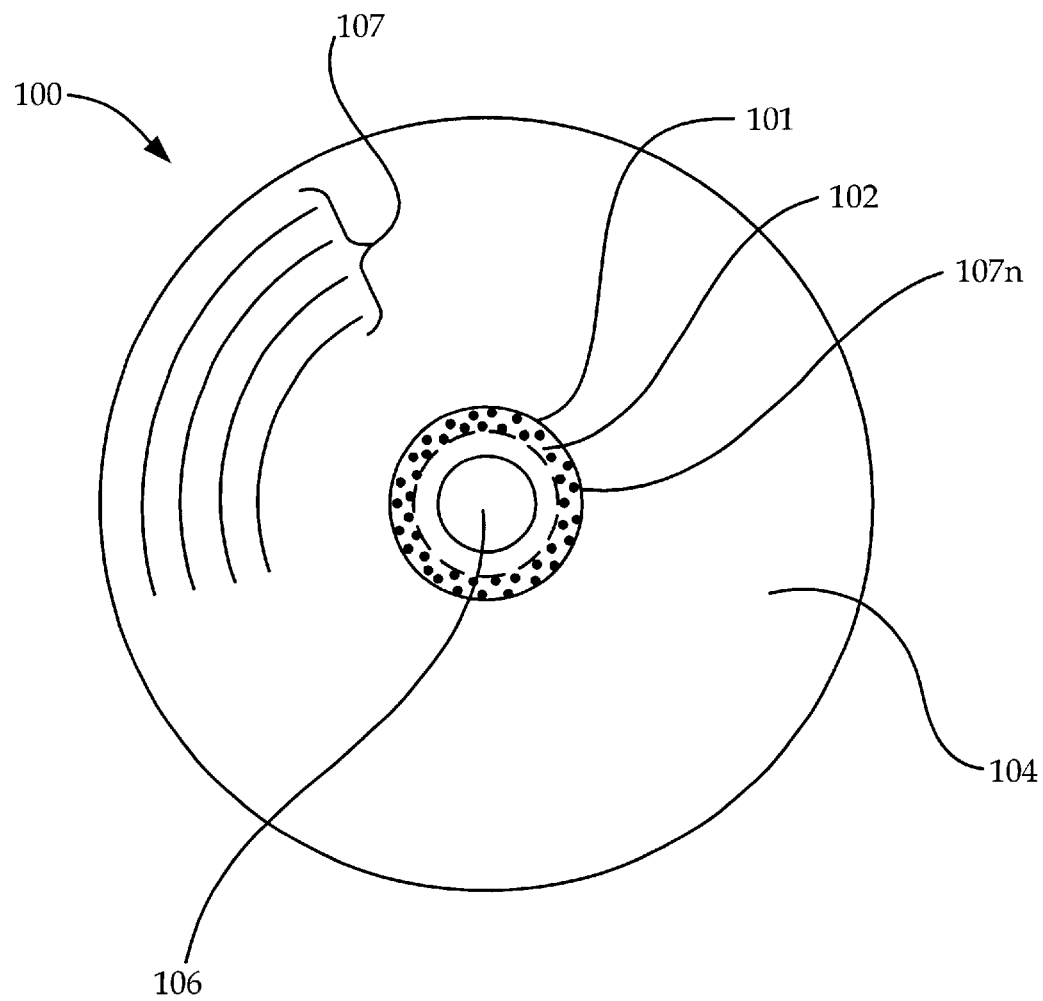
FIG. 3 is a graphical illustration of a magnetic disk processed in accordance with the present invention such that the guard band portion has been eliminated resulting additional tracks for storing data showing a last data-track in the data zone substantially adjacent the outer regions of the transition zone.

Accordingly, FIG. 2 shows process 200 comprising a servo writing step 201 which writes servo patterns on disk 100, including by example, a digital track number and an analog signal indicating positions from track center. Since it is desired to write data-tracks until just before entering transition zone 102 which is the start of landing zone 101, the method includes a step 202 of monitoring the interference between the head & disk. At step 202 a head to disk interference sensing means is required to sense when the head is positioned over the transition and/or landing zones so that writing can be stopped. By example only, a head to disk interference approach, such as that detailed in the above referenced patent application Ser. No. 08/940,929 by Tan, et al. may be employed. In the Tan et al. reference, the frequency modulation of a test readback signal is monitored to detect head to disk interference. The FM modulation will significantly increase when there is increased head/disk interference such as that encountered when the head flies over the rougher landing-zone. The monitoring of the head to disk interference is continuous, as shown at step 203, and servo writing continues as indicated by step 203a based on lack of detection of a predetermined threshold amount of interference indicating the head being in a rough surface region of the disk surface associated as being positioned in transition zone 102. Upon detection of the threshold head to disk interference amount, as indicated by step 203b, the system responds by initiating a stop servo writing command 204, which results in a recording step 205 where the last data-track is determined. FIG. 3 shows a magnetic disk 100 processed in accordance with process 200. As depicted, disk 100 now has a data zone 104 extending to transition zone 102 which results in an increased data track distribution 107 having last data-track 107n.

Figure 4:
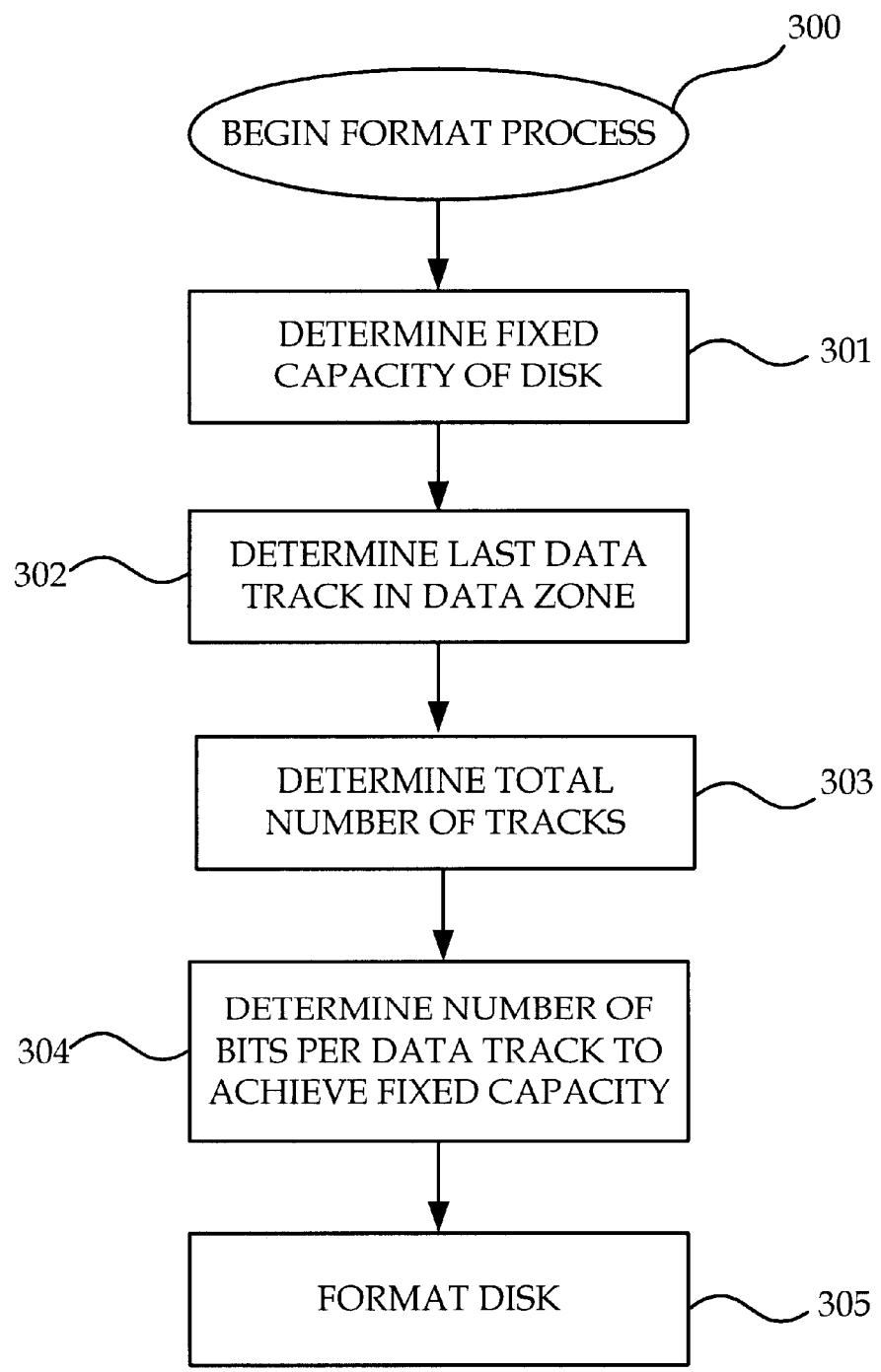
FIG. 4 is a formatting process flow for formatting in accordance with the changed boundaries of the data zone and in accordance with instructions received from a disk drive's formatting and controlling firmware.

Since there is now a change in boundary in data zone 104 for each disk processed in accordance with process 200, magnetic disk 100 must now be formatted to meet a fixed capacity for the disk drive, similar to the original capacity prior to undergoing process 200. FIG. 4 shows a formatting process 300 including step 301 for determining the required byte capacity of the disk, step 302 for determining the last data-track of the disk after process 200, a step 303 for determining the total data-tracks in data zone 104 after process 200, a step 304 for determining the required bits per track needed to achieve the desired disk capacity, and a formatting step 305.

The present invention has been particularly shown and described with respect to certain preferred embodiments of features thereof. However, it should be readily apparent to those of ordinary skill in the art that various changes and modifications in form and detail may be made without departing from the spirit and scope of the invention as set forth in the appended claims. The invention disclosed herein may be practiced without any element which is not specifically disclosed herein.

What is claimed is:

1. A magnetic disk drive manufacturing system comprising:
   a servo writing member for writing servo tracks on a surface of a magnetic disk;
   disk formatting firmware and hardware for formatting the surface of the magnetic disk; and
   means for determining a last data-track in a data zone on the surface of the magnetic disk in accordance with sensed head-to-disk surface interference information indicating presence of a landing zone region of said magnetic disk.

2. A magnetic disk drive manufacturing system, said system comprising:
   a servo writing member for writing servo information on a magnetic disk member;
   a head-to-disk interference sensing member for detecting a landing zone region of said magnetic disk member, said head-to-disk interference sensing member configured to generate a stop servo writing command to said servo writing member upon detecting an occurrence of said landing zone region; and
   wherein said servo writing member is configured to respond to said stop servo writing command, and is further configured to record a last data track indication that corresponds to detection of said occurrence of said landing zone region.

3. A magnetic disk drive manufacturing system as recited in claim 2, said system further comprising:
   means for determining a bit capacity of said magnetic disk;
   means for reading said last data track indication;
   means for determining a total number of data tracks on said magnetic disk based on said last data track indication;
   means for determining a bits per track density based on said total number of data tracks and said bit capacity; and
   means for formatting said magnetic disk.

4. A magnetic disk drive manufacturing system as recited in claim 2, in which said head-to-disk interference sensing member is frequency modulation based, and wherein the sensing member continuously monitors a read-back signal, the read-back signal having a predetermined modulation frequency when the sensing member is positioned over said landing zone.

5. A method for determining a last data track of a magnetic disk having a landing zone, and for formatting said magnetic disk, said method comprising steps of:
   (a) providing a head-to-disk interference sensing member for detecting said landing zone of said magnetic disk, said head-to-disk interference sensing member having means for generating a stop servo writing command to a servo writing member upon detecting an occurrence of said landing zone region;

(b) performing a servo writing operation, said servo writing operation including an operational step of recording data track number information on said magnetic disk;

(c) performing a head-to-disk interference sensing operation and generating said stop servo writing command upon detecting said landing zone, otherwise repeating said step (b);

(d) responding to said generated stop servo writing command in step (c) and stopping performance of said servo writing operation;

(e) recording a last data track number corresponding to a detection of said landing zone; and (f) formatting said magnetic disk member processed in accordance with said steps (b), (c), (d) and (e).

6. A method for determining a last data track of a magnetic disk as described in claim 5 and further comprising a preformatting step (g) which is performed before formatting step (f), step (g) further comprising steps of:

(g1) determining a bit capacity of said magnetic disk member;

(g2) reading said last data track indication recorded in step (g);

(g3) determining a total number of data tracks on said magnetic disk member based on said last data track indication; and (g4) determining a bits per track density based on said total number of data tracks and said bit capacity.

7. A method for determining a last data track of a magnetic disk as described in claim 5, and further comprising a step of:

(h) providing a disk drive system, the disk drive system including the magnetic disk, the landing zone being located in an inner region of the magnetic disk.

8. A method for determining a last data track of a magnetic disk as described in claim 5, and further comprising a step of:

(h) providing a servo writing member, the servo writing step (b) being performed by the servo writing member.

9. A method for determining a last data track of a magnetic disk as described in claim 7, and further comprising a step of:

(i) providing a servo writing member, the servo writing step (b) being performed by the servo writing member.

* * * * *